(12) United States Patent (10) Patent No.: US 10,162,427 B2
Wu (45) Date of Patent: Dec. 25, 2018

(54) KEY BOARD AND PORTABLE ELECTRONIC DEVICE WITH KEY BOARD

(71) Applicant: MiiCs & Partners (Shenzhen) Co., Ltd., Shenzhen (CN)

(72) Inventor: Tsung-Ju Wu, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 6 days.

(21) Appl. No.: 15/497,315

(22) Filed: Apr. 26, 2017

(65) Prior Publication Data

US 2018/0074598 A1 Mar. 15, 2018

(30) Foreign Application Priority Data

Sep. 14, 2016 (TW) .............................. 105130049 A (51) Int. Cl.
| | |
|---|---|
| *G06F 3/02* | (2006.01) |
| *G06F 3/039* | (2013.01) |
| *G06F 3/01* | (2006.01) |
| *G06F 3/03* | (2006.01) |
| *G06F 3/041* | (2006.01) |
| *G06F 3/048* | (2013.01) |
| *G06F 3/0487* | (2013.01) |
| *G06F 3/0489* | (2013.01) |

(52) U.S. Cl.
CPC .......... *G06F 3/0227* (2013.01); *G06F 3/0219* (2013.01); *G06F 3/039* (2013.01); *G06F 3/01* (2013.01); *G06F 3/02* (2013.01); *G06F 3/0202* (2013.01); *G06F 3/03* (2013.01); *G06F 3/041* (2013.01); *G06F 3/048* (2013.01); *G06F 3/0414* (2013.01); *G06F 3/0487* (2013.01); *G06F 3/0489* (2013.01)

(58) Field of Classification Search
CPC ................. G06F 3/0202; G06F 3/0219; G06F 3/023–3/0238; G06F 3/0227; G06F 3/0489–3/04897; G06F 3/041–3/047
USPC ...... 200/237–345; 341/20–35; 345/168–169, 345/173–178; 400/490–495.1
See application file for complete search history.

(56) References Cited

U.S. PATENT DOCUMENTS

| | | | | |
|---|---|---|---|---|
| 7,151,528 | B2* | 12/2006 | Taylor ................... | G06F 3/0414 345/168 |
| 8,988,355 | B2* | 3/2015 | Solomon ............... | G06F 1/1662 345/168 |
| 2004/0206615 | A1* | 10/2004 | Aisenbrey ............ | H01H 13/702 200/262 |
| 2005/0190159 | A1* | 9/2005 | Skarine ................. | G06F 1/1626 345/168 |
| 2007/0247431 | A1* | 10/2007 | Skillman ................ | G06F 3/023 345/169 |

(Continued)

FOREIGN PATENT DOCUMENTS

GB 2516439 A * 1/2015 ......... G06F 3/04886

*Primary Examiner* — Michael Pervan
(74) *Attorney, Agent, or Firm* — ScienBiziP, P.C.

(57) ABSTRACT

A removable key board for keying in on a touch panel, includes an insulating spacer defining a plurality of receiving holes, a plurality of supporting pillars in the receiving holes and a plurality of electrical connecting pads configured for electrically connecting to the touch panel and arranged on one side of the insulating spacer. Pressing each key on the removable keyboard applies an input touch to the touch panel. A portable electronic device is also provided.

20 Claims, 7 Drawing Sheets

(56) References Cited

U.S. PATENT DOCUMENTS

| | | | |
|---|---|---|---|
| 2011/0241999 A1* | 10/2011 | Thier | G06F 3/023 |
| | | | 345/168 |
| 2012/0326987 A1* | 12/2012 | Frojdh | G06F 3/0202 |
| | | | 345/168 |
| 2013/0335327 A1* | 12/2013 | Solomon | G06F 1/1662 |
| | | | 345/168 |
| 2014/0203953 A1* | 7/2014 | Moser | G06F 3/0202 |
| | | | 341/27 |

* cited by examiner

KEY BOARD AND PORTABLE ELECTRONIC DEVICE WITH KEY BOARD

CROSS-REFERENCE TO RELATED APPLICATIONS

This application claims priority to Taiwanese Patent Application No. 105130049 filed on Sep. 14, 2016, the contents of which are incorporated by reference herein.

FIELD

The subject matter herein generally relates to portable electronic device.

BACKGROUND

A portable electronic device, such as ipad or phone, with capacitive touch screen is popular. Users can use fingers to touch the capacitive touch screen.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain sections have been exaggerated to better illustrate details and features of the present disclosure.

Several definitions that apply throughout this disclosure will now be presented.

The term "substantially" is defined to be essentially conforming to the dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a key board, configured for placement on and keying into a touch panel, including: an insulating spacer defining a plurality of receiving holes; a plurality of supporting pillars, each of the plurality of supporting pillars corresponding to and receiving in one of the plurality of receiving holes; a plurality of electrical connecting pads configured for electrical connecting to the touch panel and arranged on one side of the insulating spacer, each of the plurality of electrical connecting pads corresponding to and connected to one of the plurality of supporting pillars; a plurality of insulating pads configured to be pressed for keying in and arranged on another side of the insulating spacer, each of the plurality of insulating pads corresponding to and connected to one of the plurality of supporting pillars; and a plurality of elastic elements arranged between the insulating spacer and the plurality of insulating pads, each of the plurality of elastic elements corresponding to one of the plurality of insulating pads.

The present disclosure is described in relation to a portable electronic device, including: a touch panel defining a plurality of touch areas; and a key board removably positioned on and connected to the touch panel, the key board including: an insulating spacer defining a plurality of receiving holes; a plurality of supporting pillars, each of the plurality of supporting pillars corresponding to and received in one of the plurality of receiving holes; a plurality of electrical connecting pads arranged on one side of the insulating spacer, each of the plurality of electrical connecting pads corresponding to and connected to one of the plurality of supporting pillars, each of the plurality of electrical connecting pads corresponding to one of the plurality of touch areas; a plurality of insulating pads arranged on another side of the insulating spacer, each of the plurality of insulating pads corresponding to and connected to one of the plurality of supporting pillars; and a plurality of elastic elements arranged between the insulating spacer and the plurality of insulating pads, each of the plurality of elastic elements corresponding to one of the plurality of insulating pads; wherein when one of the plurality of insulating pads is pressed, a corresponding one of the plurality of elastic elements is compressed, and one corresponding electrical connecting pad is moved to be in contact with the corresponding touch area of the touch panel and apply input.

FIGS. 1 to 5 illustrate a first exemplary embodiment of a portable electronic device 10 including a touch panel 200 and a key board 100.

The touch panel 200 includes a capacitive touch screen 201. The capacitive touch screen 201 provides a virtual keyboard interface 202. The virtual keyboard interface 202 defines a plurality of touch areas 203.

The key board 100 is removably positioned on and connected to the capacitive touch screen 201 and is aligned with the virtual keyboard interface 202. That is, the key board 100 can be separated from the capacitive touch screen

201 when not used. The key board 100 is configured for keying in on the touch panel 200.

The key board 100 includes a supporting body 11, an insulating spacer 12, a plurality of supporting pillars 13, a plurality of electrical connecting pads 14, a plurality of insulating pads 15, and a plurality of elastic elements 16.

The supporting body 11 is positioned on and connected to the capacitive touch screen 201.

In the present exemplary embodiment, the supporting body 11 is made of insulating material.

Figure 1:
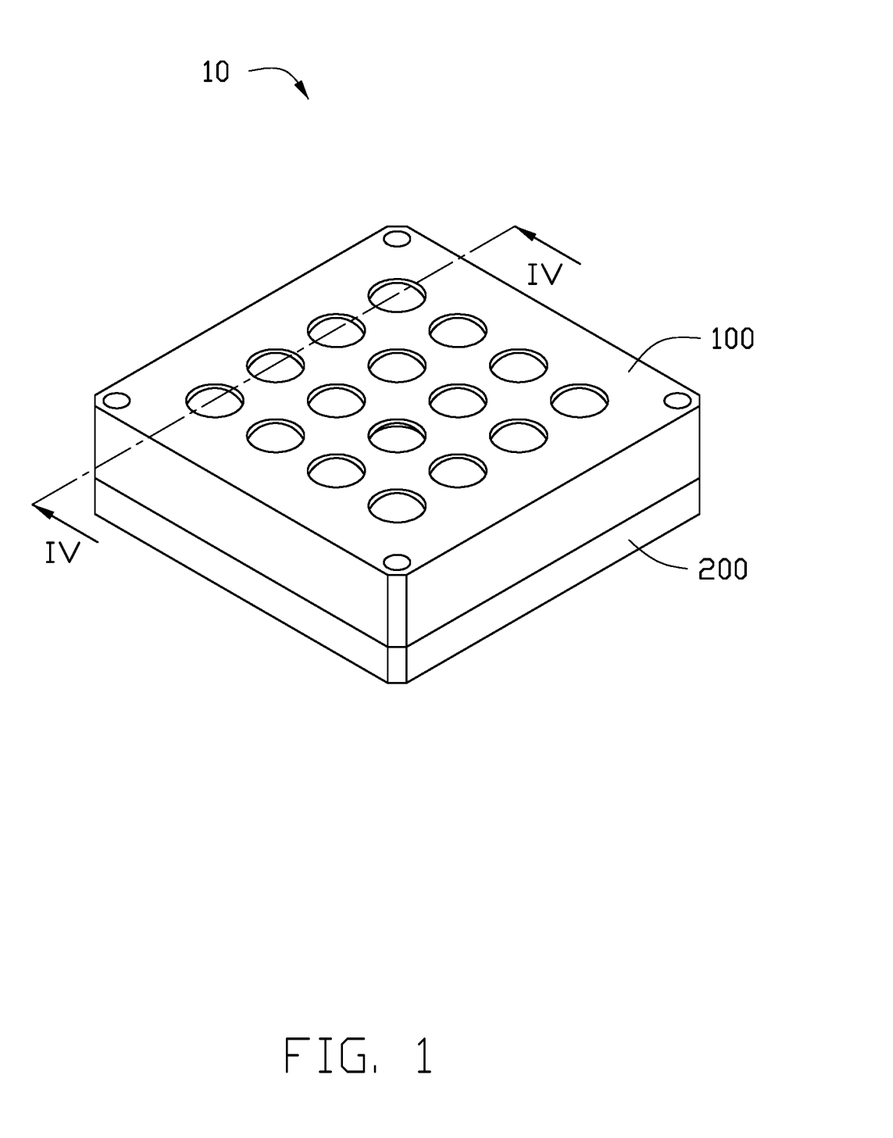
FIG. 1 is an isometric view of a first exemplary embodiment of a portable electronic device.
Figure 2:
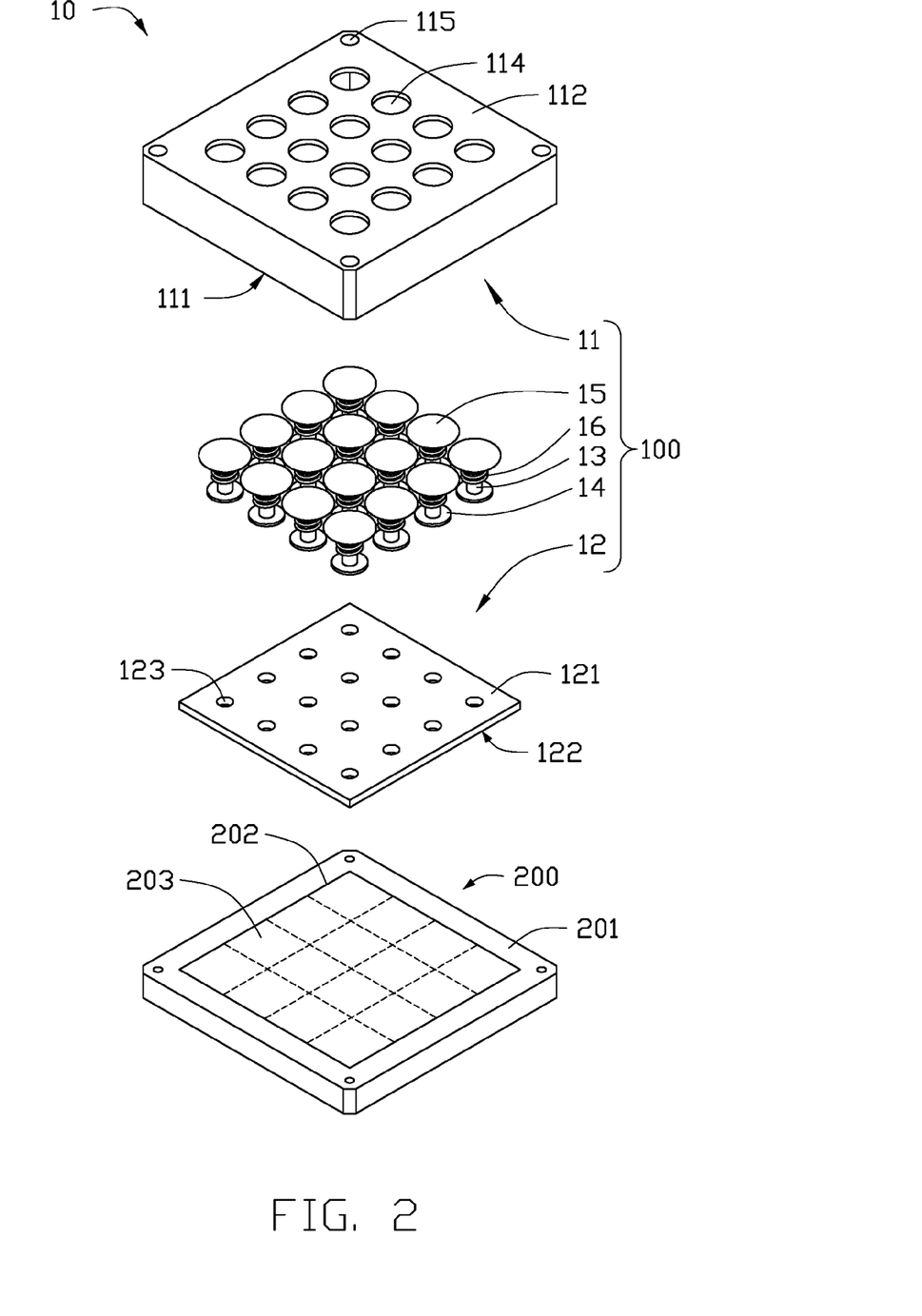
FIG. 2 is a top exploded view in accordance with the first exemplary embodiment of the portable electronic device shown in FIG. 1.
Figure 3:
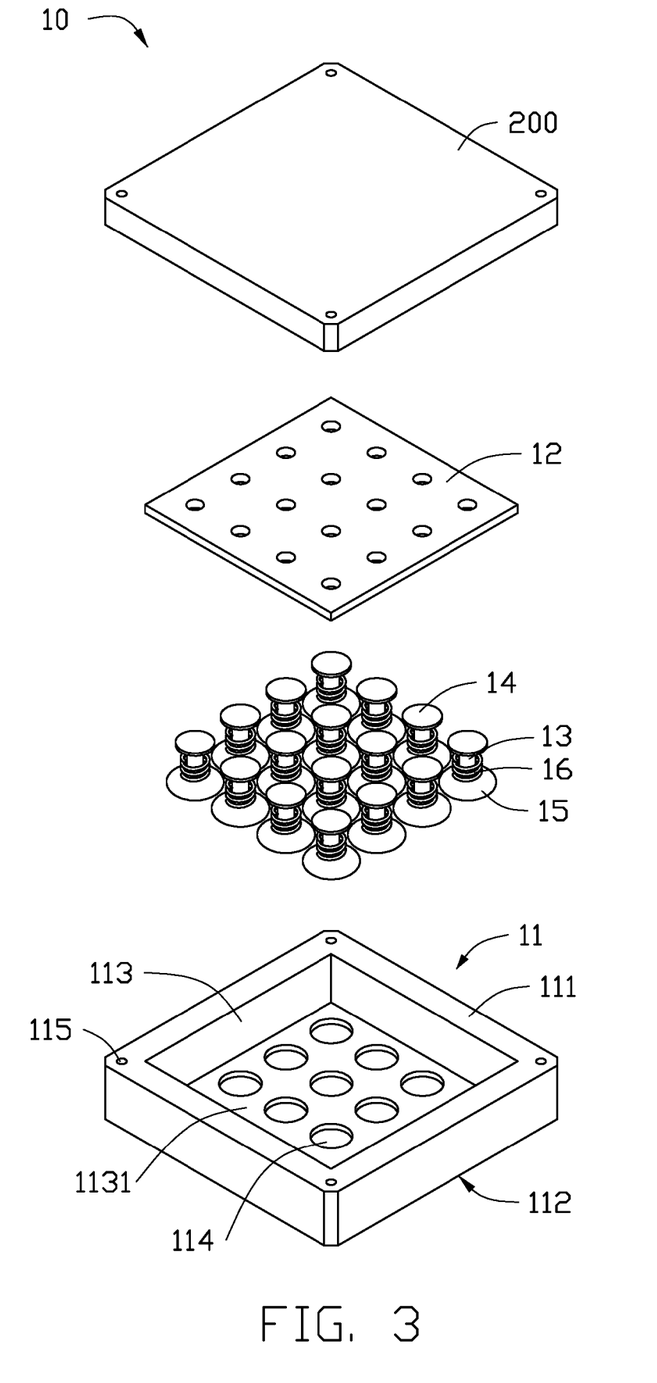
FIG. 3 is a bottom exploded view in accordance with the first exemplary embodiment of the portable electronic device shown in FIG. 1.
Figure 4:
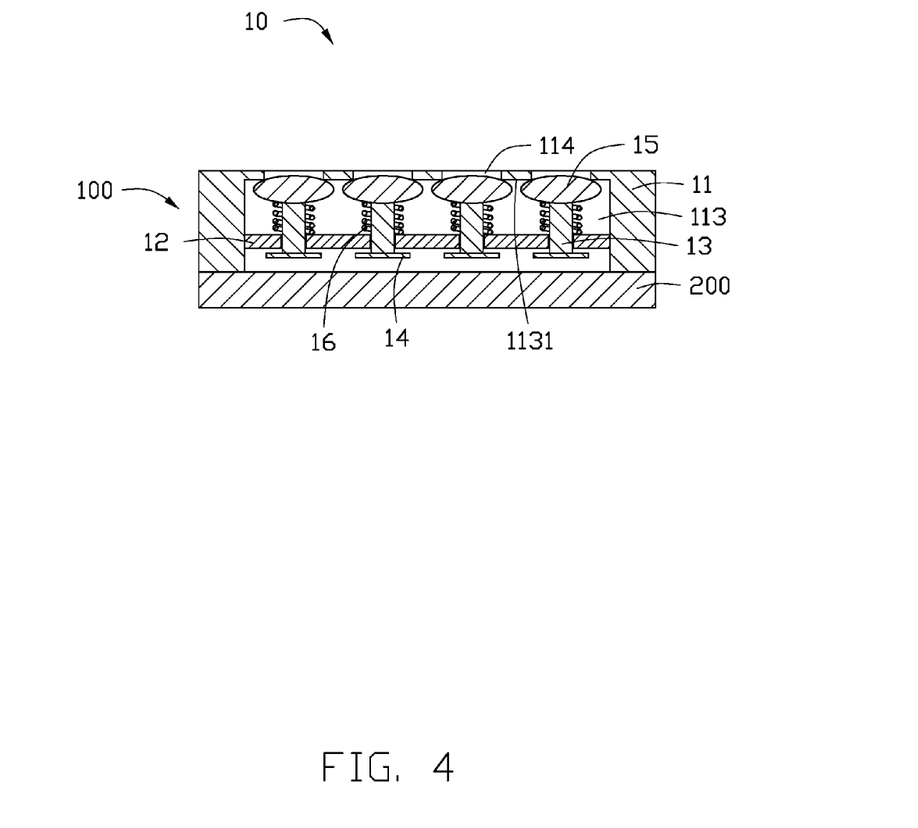
FIG. 4 is a cross section view in accordance with the first exemplary embodiment of the portable electronic device shown in FIG. 1.

The supporting body 11 includes a first surface 111 and a second surface 112 opposite to the first surface 111. The supporting body 11 defines a receiving groove 113 from the first surface 111 into the inside of the supporting body 11.

In the present exemplary embodiment, the supporting body 11 is substantially flat. The first surface 111 is parallel to the second surface 112. The receiving groove 113 includes a bottom surface 1131 parallel to the first surface 111.

The supporting body 11 defines a plurality of through holes 114 passing through the bottom surface 1131 and the second surface 112. The plurality of through holes 114 is arranged in an array.

In the present exemplary embodiment, each of the plurality of through holes 114 corresponds to and is aligned with one of the plurality of touch areas 203.

A shape of each of the plurality of through holes 114 can be cylindrical, prismatic, frustoconical, or other.

In the present exemplary embodiment, the shape of each of the plurality of through holes 114 is cylindrical.

The supporting body 11 further includes a plurality of fixing elements 115 configured for fixing the supporting body 11 on the touch panel 200.

In the present exemplary embodiment, the plurality of fixing elements 115 is a plurality of positioning holes passing through the bottom surface 1131 and the second surface 112. Each of the plurality of positioning holes can coordinate with a bolt (not shown) to fix the supporting body 11 on the touch panel 200.

In other embodiments, each of the plurality of fixing elements 115 can be a buckle or other connecting element.

In other embodiments, the second surface 112 can be a three dimensional surface, such as a spherical surface, a wavy surface, or an irregular surface.

The insulating spacer 12 is fixed on side walls of the receiving groove 113 and is spaced from the bottom surface 1131.

The insulating spacer 12 includes a third surface 121 and a fourth surface 122 opposite to the third surface 121. The insulating spacer 12 defines a plurality of receiving holes 123 passing through the third surface 121 and the fourth surface 122. Each of the plurality of receiving holes 123 is aligned with and corresponds to one of the plurality of through holes 114.

In the present exemplary embodiment, the insulating spacer 12 is substantially flat. The third surface 121 is parallel to the fourth surface 122.

A shape of each of the plurality of receiving holes 123 can be cylindrical, prismatic, frustoconical, or other.

In the present exemplary embodiment, the shape of each of the plurality of receiving holes 123 is cylindrical.

In the present exemplary embodiment, the insulating spacer 12 is integrated with the supporting body 11.

Each of the plurality of supporting pillars 13 is corresponding to and received in one of the receiving holes 123. A length of each of the plurality of supporting pillars 13 is larger than a thickness of a corresponding one of the plurality of receiving holes 123, therefore two ends of each of the plurality of supporting pillars 13 separately extend out of two ends of the corresponding receiving hole 123. A diameter of each of the plurality of supporting pillars 13 is slightly less than that of the corresponding receiving hole 123, therefore each of the plurality of supporting pillars 13 can be moved up and down in the corresponding receiving hole 123.

The plurality of the supporting pillars 13 can be made of electronic material or insulating material.

Preferably, the plurality of the supporting pillars 13 can be made of rigid electronic material or rigid insulating material, such as metal, rigid resin, or rigid rubber.

The plurality of electrical connecting pads 14 is arranged on one side of the insulating spacer 12 away from the second surface 112. Each of the plurality of electrical connecting pads 14 is corresponding to and connected with one of the plurality of supporting pillars 13. Each of the plurality of electrical connecting pads 14 is connected with one end of a corresponding one of the plurality of supporting pillars 13. The plurality of electrical connecting pads 14 is spaced with and insulated from each other. The plurality of electrical connecting pads 14 is made of electronic material. The plurality of electrical connecting pads 14 is configured for electrical connecting to the touch panel.

In the present exemplary embodiment, each of the plurality of electrical connecting pads 14 is a round-sheet.

In the present exemplary embodiment, a diameter of each of the plurality of electrical connecting pads 14 is larger than that of the corresponding one of the receiving holes 123.

Each of the plurality of electrical connecting pads 14 can be integrated with the corresponding supporting pillar 13 when the supporting pillars 13 are made of electronic material.

In other embodiments, each of the plurality of electrical connecting pads 14 can be other shapes, such as a hollow capsule.

Further, each of the plurality of electrical connecting pads 14 can be a hollow capsule with a narrow portion connected with the corresponding supporting pillar 13 and a wider portion away from the corresponding supporting pillar 13.

The plurality of insulating pads 15 is arranged on another side of the insulating spacer 12 near from the second surface 112. Each of the plurality of insulating pads 15 is corresponding to and connected with one of the plurality of supporting pillars 13. Each of the plurality of insulating pads 15 is connected with another end of a corresponding one of the plurality of supporting pillars 13. The plurality of insulating pads 15 is spaced and insulated from each other. Each of the plurality of insulating pads 15 is corresponding to and exposed in one of the plurality of through holes 114. Each of the plurality of insulating pads 15 can be pressed for keying in.

In the present exemplary embodiment, the plurality of insulating pads 15 is received in the receiving groove 113. A size of each of the plurality of insulating pads 15 is larger than that of a corresponding one of the plurality of through holes 114.

Each of the plurality of insulating pads 15 can be integrated with the corresponding supporting pillars 13 when the supporting pillars 13 are made of insulating material.

Preferably, the plurality of insulating pads 15 is made of rubber.

In the present exemplary embodiment, each of the plurality of insulating pads 15 is a flattened sphere.

In other embodiments, each of the plurality of insulating pads 15 can have other shapes, such as a hollow capsule.

Each of the plurality of elastic elements 16 is corresponding to one of the plurality of supporting pillars 13. Each of the plurality of elastic elements 16 is arranged between a corresponding one of the plurality of insulating pads 15 and the insulating spacer 12.

When one of the plurality of elastic elements 16 is at rest, the corresponding insulating pad 15 is in contact with the bottom surface 1131, and the corresponding electrical connecting pad 14 is located between the first surface 111 and the third surface 121.

Figure 5:
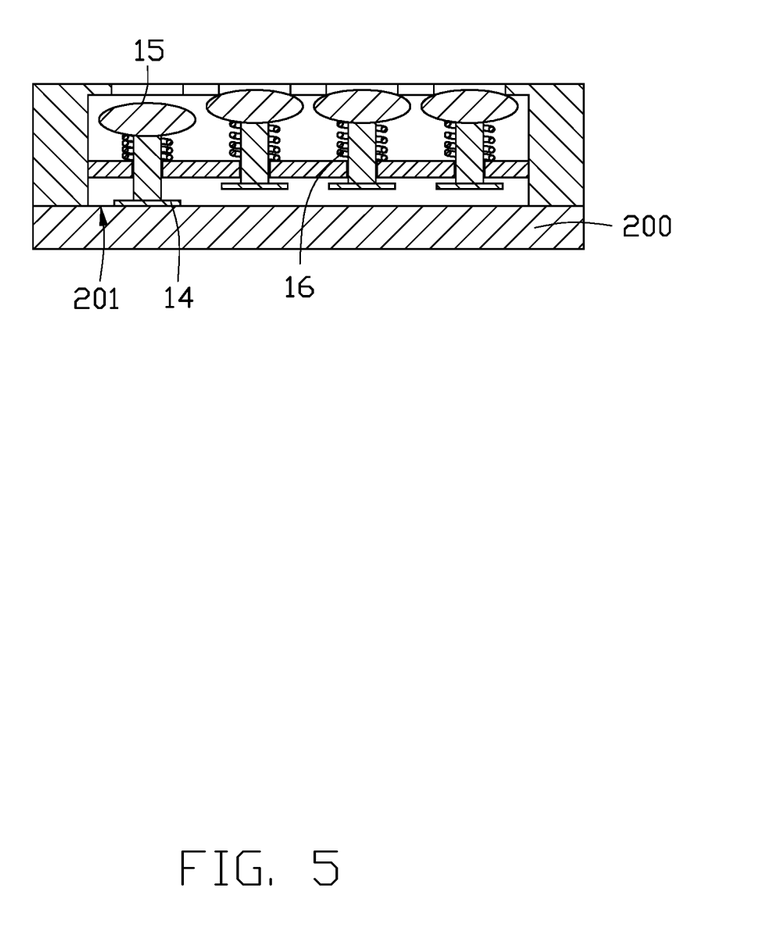
FIG. 5 is a cross section view in accordance with the first exemplary embodiment of the portable electronic device shown in FIG. 1, wherein an insulating pad is pressed and an electrical connecting pad is in contact with a touch panel.

As shown in FIG. 5, when one of the plurality of insulating pads 15 is pressed, the corresponding elastic element 16 is compressed, the corresponding electrical connecting pad 14 is moved to the first surface 111 to be in contact with and applying a touch to the corresponding touch area 203 of the touch panel 200.

In the present exemplary embodiment, each of the plurality of elastic elements 16 is a coil spring wrapped around a corresponding supporting pillar 12. An outer size of each of the plurality of elastic elements 16 is larger than a size of the corresponding through hole 114 and a size of the corresponding receiving hole 123.

In other embodiments, each of the plurality of elastic elements 16 can be a snap dome arranged between one of the plurality of insulating pads 15 and the insulating spacer 12.

In other embodiments, the second surface 112 can be a three dimensional surface, such as a spherical surface, a wavy surface, or an irregular surface.

Figure 6:
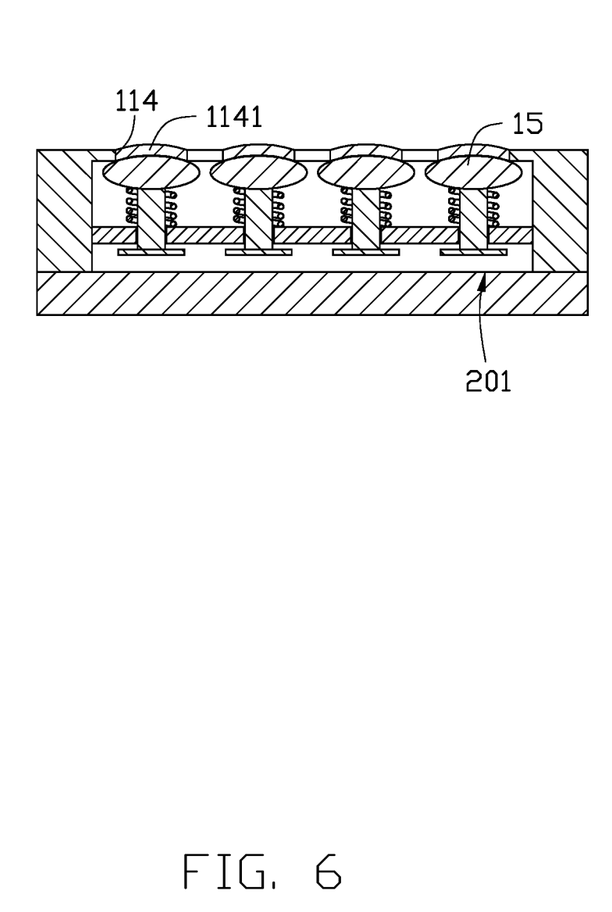
FIG. 6 is a cross section view in accordance with a second exemplary embodiment of the portable electronic device, wherein an elastic adhesive is filled in and covers each through hole defined on a supporting body.

In a second exemplary embodiment, as shown in FIG. 6, an elastic adhesive 1141 can be filled in to cover each of the plurality of through holes 114. The elastic adhesive 1141 can be made of resin or silicone.

Figure 7:
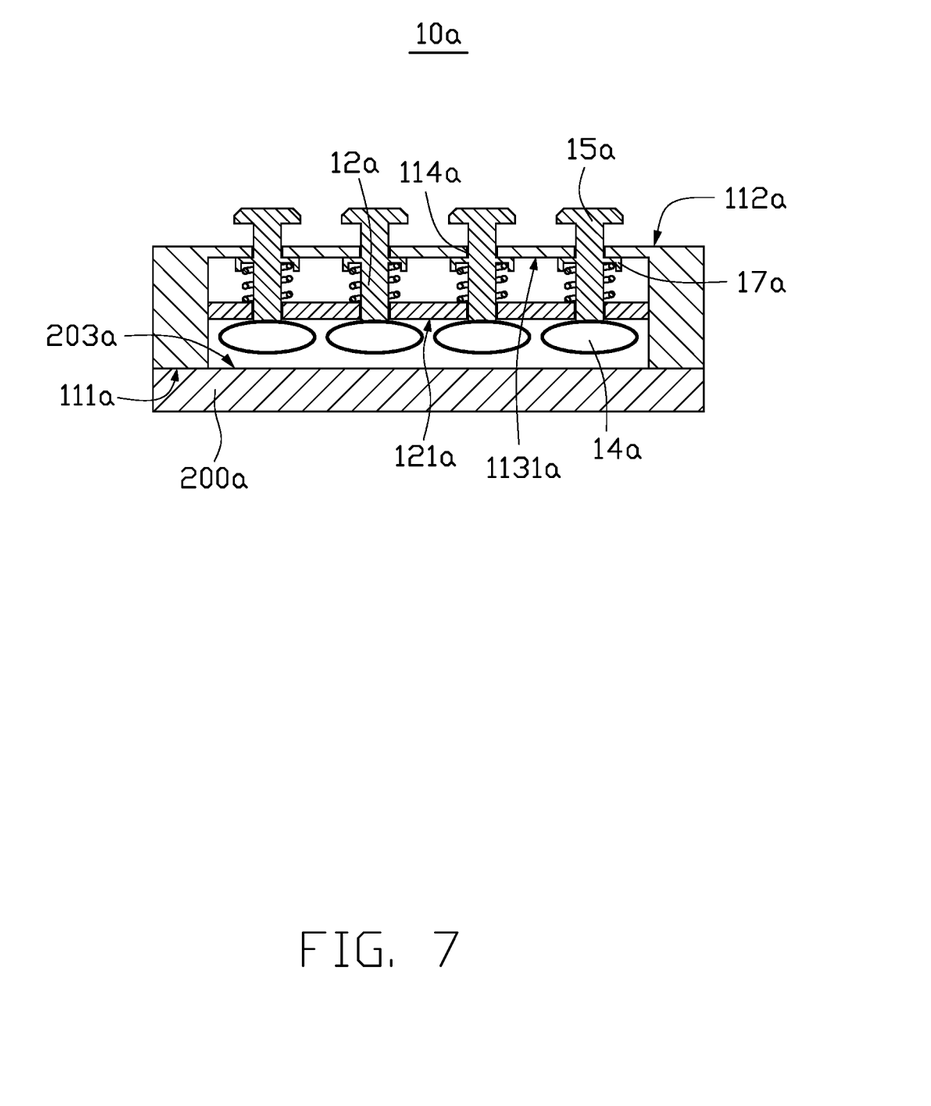
FIG. 7 is a cross section view in accordance with a third exemplary embodiment of the portable electronic device.

FIG. 7 illustrates a third exemplary embodiment of a portable electronic device 10a, similar to the portable electronic device 10 in first exemplary embodiment. The differences are that each of the plurality of electrical connecting pads 14a is hollow capsule shaped, each of the plurality of supporting pillars 12a is extending out from one corresponding through hole 114a, each of the plurality of insulating pads 15a is arranged above the second surface 112a, and a baffle sheet 17a is arranged between each of the plurality of electric elements 16a and the bottom surface 1131a. Each of the plurality of supporting pillars 12a passes through and is fixed on the baffle sheet 17a.

When one of the plurality of elastic elements 16a is at rest, the corresponding one of the plurality of elastic elements 16a is in contact with the baffle sheet 17a, and the corresponding electrical connecting pad 14a is located between the first surface 111a and the third surface 121a.

When one of the plurality of insulating pads 15a is pressed, the corresponding elastic element 16a is compressed, and the corresponding electrical connecting pad 14a is moved to the first surface 111a to be in contact with the corresponding touch area 203a of the touch panel 200a.

In other embodiments, each of the plurality of electrical connecting pads 14a can be hollow capsule shaped with a narrow portion connected with a corresponding supporting pillar 13a and a wider portion away from the corresponding supporting pillar 13a.

In other embodiments, each of the plurality of electrical connecting pads 14a can have other shapes, such as round-sheet.

In other embodiment, a shape of each of the plurality of insulating pads 15a can be hollow capsule.

In other embodiments, the second surface 112a can be a three dimensional surface, such as a spherical surface, a wavy surface, or an irregular surface.

The exemplary embodiments shown and described above are only examples. Many details are often found in the art such as the other features of a key board and a portable electronic device with the key board. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the exemplary embodiments described above may be modified within the scope of the claims.

What is claimed is:

1. A key board, configured for placement on and keying into a touch panel, comprising:
   an insulating spacer defining a plurality of receiving holes;
   a plurality of supporting pillars, each of the plurality of supporting pillars corresponding to and receiving in one of the plurality of receiving holes;
   a plurality of electrical connecting pads configured for electrical connecting to the touch panel and arranged on one side of the insulating spacer, each of the plurality of electrical connecting pads corresponding to and connected to one of the plurality of supporting pillars;
   a plurality of insulating pads configured to be pressed for keying in and arranged on another side of the insulating spacer, each of the plurality of insulating pads corresponding to and connected to one of the plurality of supporting pillars; and
   a plurality of elastic elements arranged between the insulating spacer and the plurality of insulating pads, each of the plurality of elastic elements corresponding to one of the plurality of insulating pads.

2. The key board of claim 1, wherein the plurality of supporting pillars is made of electronic material, each of the plurality of electrical connecting pads is integrated with a corresponding one of the plurality of supporting pillars.

3. The key board of claim 1, wherein the plurality of supporting pillars is made of insulating material, each of the plurality of insulating pads is integrated with a corresponding one of the plurality of supporting pillars.

4. The key board of claim 1, wherein each of the plurality of electrical connecting pads is a hollow capsule.

5. The key board of claim 4, wherein each of the plurality of electrical connecting pads is a hollow capsule with a narrow portion connected with a corresponding one of the plurality of supporting pillars and a wider portion away from the corresponding one of the plurality of supporting pillars.

6. The key board of claim 1, further comprising a supporting body comprising a first surface configured for connecting with the touch panel, and a second surface opposite to the first surface; the supporting body defining a receiving groove from the first surface to the second surface, the insulating spacer fixed in the receiving groove and spaced from a bottom surface of the receiving groove; the supporting body further defining a plurality of through holes from the bottom surface to the second surface, each of the plurality of through holes corresponding to one of the plurality of receiving holes, each of the plurality of insulating pads exposed from a corresponding one of the plurality of through holes.

7. The key board of claim 6, wherein the second surface is a three dimensional surface.

8. The key board of claim 6, wherein each of the plurality of supporting pillars passes through a corresponding one of the plurality of through holes, the plurality of insulating pads is arranged above the second surface, a plurality of baffles is arranged between the bottom surface and the plurality of elastic elements, each of the plurality of baffles is corresponding to and fixed on one of the plurality of supporting pillars.

9. The key board of claim 6, wherein the plurality of supporting pillars and the plurality of insulating pads are received in the receiving groove, each of the plurality insulating pad is in contact with the bottom surface when the elastic element is at rest.

10. The key board of claim 1, wherein each of the plurality of elastic element is a coil spring covering a corresponding one of the plurality of supporting pillars.

11. A portable electronic device, comprising:
a touch panel comprising a capacitive touch screen defining a plurality of touch areas; and
a key board removably positioned on and connected to the touch panel, the key board comprising:
an insulating spacer defining a plurality of receiving holes;
a plurality of supporting pillars, each of the plurality of supporting pillars corresponding to and received in one of the plurality of receiving holes;
a plurality of electrical connecting pads arranged on one side of the insulating spacer, each of the plurality of electrical connecting pads corresponding to and connected to one of the plurality of supporting pillars, each of the plurality of electrical connecting pads corresponding to one of the plurality of touch areas;
a plurality of insulating pads arranged on another side of the insulating spacer, each of the plurality of insulating pads corresponding to and connected to one of the plurality of supporting pillars; and
a plurality of elastic elements arranged between the insulating spacer and the plurality of insulating pads, each of the plurality of elastic elements corresponding to one of the plurality of insulating pads;
wherein when one of the plurality of insulating pads is pressed, one corresponding elastic element is compressed, and one corresponding electrical connecting pad is moved to be in contact with a corresponding one of the plurality of touch areas of the touch panel and apply input.

12. The portable electronic device of claim 11, wherein the plurality of supporting pillars is made of electronic material, each of the plurality of electrical connecting pads is integrated with a corresponding one of the plurality of supporting pillars.

13. The portable electronic device of claim 11, wherein the plurality of supporting pillars is made of insulating material, each of the plurality of insulating pads is integrated with a corresponding one of the plurality of supporting pillars.

14. The portable electronic device of claim 11, wherein each of the plurality of electrical connecting pads is a hollow capsule.

15. The portable electronic device of claim 14, wherein each of the plurality of electrical connecting pads is a hollow capsule with a narrow portion connected with a corresponding one of the plurality of supporting pillars and a wider portion away from the corresponding one of the plurality of supporting pillars.

16. The portable electronic device of claim 11, further comprising a supporting body comprising a first surface configured for connecting with the touch panel, and a second surface opposite to the first surface; the supporting body defining a receiving groove from the first surface to the second surface, the insulating spacer fixed in the receiving groove and spaced from a bottom surface of the receiving groove; the supporting body further defining a plurality of through holes from the bottom surface to the second surface, each of the plurality of through holes corresponding to one of the plurality of receiving holes, each of the plurality of insulating pads exposed from the corresponding one of the plurality of through holes.

17. The portable electronic device of claim 16, wherein the second surface is a three dimensional surface.

18. The portable electronic device of claim 16, wherein each of the plurality of supporting pillars passes through one corresponding through hole, the plurality of insulating pads is arranged above the second surface, a plurality of baffles is arranged between the bottom surface and the plurality of elastic elements, each of the plurality of baffles is corresponding to and fixed on one of the plurality of supporting pillars.

19. The portable electronic device of claim 16, wherein the plurality of supporting pillars and the plurality of insulating pads are received in the receiving groove, each of the plurality of corresponding insulating pad is in contact with the bottom surface when the elastic element is at rest.

20. The portable electronic device of claim 11, wherein each of the plurality of elastic element is a coil spring covering a corresponding one of the plurality of supporting pillars.

* * * * *